US008693063B2

(12) United States Patent
Ikeno

(10) Patent No.: US 8,693,063 B2
(45) Date of Patent: Apr. 8, 2014

(54) IMAGE-READING DEVICE

(75) Inventor: Takahiro Ikeno, Owariasahi (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 1558 days.

(21) Appl. No.: 11/472,532

(22) Filed: Jun. 22, 2006

(65) Prior Publication Data

US 2007/0002408 A1     Jan. 4, 2007

(30) Foreign Application Priority Data

Jun. 30, 2005 (JP) ................................. 2005-193165

(51) Int. Cl.
*H04N 1/40* (2006.01)
*H04N 1/04* (2006.01)

(52) U.S. Cl.
USPC ........... 358/445; 358/443; 358/444; 358/471; 358/482

(58) Field of Classification Search
USPC ......... 358/482, 483, 443, 445, 450, 486, 474, 358/497, 505, 506, 487, 512, 513, 514, 471, 358/444; 250/208.1, 234, 235, 236, 216; 382/312, 299
See application file for complete search history.

(56) References Cited

U.S. PATENT DOCUMENTS

| | | | |
|---|---|---|---|
| 4,672,453 A | | 6/1987 | Sakamoto |
| 4,786,820 A | * | 11/1988 | Ogino et al. .................. 358/482 |
| 5,594,501 A | * | 1/1997 | Suzuki .......................... 348/362 |
| 6,054,703 A | * | 4/2000 | Liu ............................ 250/208.1 |
| 6,172,352 B1 | * | 1/2001 | Liu ............................ 250/208.1 |
| 6,219,468 B1 | * | 4/2001 | Yukawa et al. ............... 382/312 |
| 6,539,129 B1 | * | 3/2003 | Yushiya ........................ 382/323 |
| 6,646,668 B2 | * | 11/2003 | Tanimoto et al. ............. 347/234 |
| 6,950,132 B1 | * | 9/2005 | Kozuka .......................... 348/243 |
| 7,046,283 B1 | * | 5/2006 | Kamasz et al. ............... 348/295 |
| 7,086,596 B2 | * | 8/2006 | Meier et al. .............. 235/462.25 |
| 7,199,387 B2 | | 4/2007 | Lampersberger |
| 7,317,562 B2 | * | 1/2008 | Sawada ......................... 358/509 |
| 7,349,134 B2 | * | 3/2008 | Kato ............................. 358/482 |
| 7,352,497 B2 | * | 4/2008 | Hori ............................. 358/482 |

(Continued)

FOREIGN PATENT DOCUMENTS

| | | |
|---|---|---|
| JP | S61-043065 A | 3/1986 |
| JP | S62-116062 A | 5/1987 |

(Continued)

OTHER PUBLICATIONS

Japanese Office Action issued in corresponding Japanese Application No. 2005-193165 dated Nov. 9, 2007.

*Primary Examiner* — Firmin Backer
*Assistant Examiner* — Jonathan Beckley
(74) *Attorney, Agent, or Firm* — Baker Botts L.L.P.

(57) ABSTRACT

An image-reading device includes a plurality of image sensors, a starting signal generator and a signal timing regulator. Each image sensor reads images on a pixel basis and generating an image signal indicative of the image. The image signal is an analog signal. The starting signal generator generates starting signals at every predetermined time period. A sampling period for sampling the image signal is set within the predetermined time period. In response to the starting signal sequentially inputted to the image sensors, the image sensors read the image until the predetermined time period is expired. The signal timing regulator delays an input timing at which the starting signal is inputted to the image sensor so that the sampling periods for the plurality of image sensors are different from one another.

14 Claims, 8 Drawing Sheets

(56) References Cited

U.S. PATENT DOCUMENTS

| | | | |
|---|---|---|---|
| 7,394,579 B2 * | 7/2008 | Takahashi | 358/483 |
| 7,408,683 B2 * | 8/2008 | Sato et al. | 358/474 |
| 7,441,853 B2 * | 10/2008 | Takata | 347/14 |
| 7,602,536 B2 * | 10/2009 | Takahashi | 358/474 |
| 2004/0105135 A1 | 6/2004 | Sawada | |

FOREIGN PATENT DOCUMENTS

| | | |
|---|---|---|
| JP | H7236026 | 9/1995 |
| JP | H10285330 | 10/1998 |
| JP | H11-313192 A | 11/1999 |
| JP | 2003298813 | 10/2003 |
| JP | 2005-231359 A | 9/2005 |

\* cited by examiner

IMAGE-READING DEVICE

BACKGROUND OF THE INVENTION

1. Field of the Invention

The present invention relates to an image-reading device, and particularly to an image-reading device employing a contact image sensor (CIS) having a plurality of image sensor integrated circuits (IC) chips arranged linearly.

2. Description of Related Art

Recently, time period of clock signal is used at a boundary speed at which an image sensor can read an image. One conventional image-reading device disclosed in Japanese unexamined patent application publication No. 2003-298813 includes a contact image sensor having a plurality of image sensor IC chips arranged linearly and divided into blocks of a natural multiple of three. Each block outputs an image signal to a triple-channel analog front end (AFE), thereby improving the speed for reading image signals. The triple-channel AFE is widely used in image-reading devices because, along with single-channel AFEs, triple-channel AFEs are more popular than AFEs having another number of channels and are mass-produced and, therefore, less expensive.

Another conventional image-reading device disclosed in Japanese unexamined patent application publication No. HEI-7-236026 is provided with a plurality of multiplexers. The image-reading device can increase the speed for outputting data in proportion to the number of the multiplexers by outputting the data from the plurality of multiplexers.

The conventional image-reading device disclosed in Japanese unexamined patent application publication No. 2003-298813 is problematic in that when the image reading area increases, the number of blocks of image sensor IC chips into which the contact image sensor is divided will likely increase, thereby requiring a plurality of triple-channel AFEs. When using contact image sensors for an A3-size original, for example, the contact image sensor is divided into six blocks of image sensor IC ships, thereby requiring two triple-channel AFEs.

In addition, a sampling period among a single pixel reading period in which the image sensor IC ship can samples an image is one part of the single pixel reading period. Therefore, the image-reading device disclosed in Japanese unexamined patent application publication No. HEI-7-236026 is problematic in that a non-sampling period among a single pixel reading period that is not used for sampling prevents the speed for outputting data from increasing.

SUMMARY OF THE INVENTION

In view of the foregoing, it is an object of the present invention to provide an image-reading device capable of achieving a fast image-reading speed with few AFEs.

In order to attain the above and other objects, the present invention provides an image-reading device including a plurality of image sensors, a starting signal generator and a signal timing regulator. Each image sensor reads images on a pixel basis and generates an image signal indicative of the image. The image signal is an analog signal. The starting signal generator generates starting signals at every predetermined time period. A sampling period for sampling the image signal is set within the predetermined time period. In response to the starting signal sequentially inputted to the image sensors, the image sensors read the image until the predetermined time period is expired. The signal timing regulator delays an input timing at which the starting signal is inputted to the image sensor so that the sampling periods for the plurality of image sensors are different from one another.

Another aspect of the present invention provides an image-reading device including a plurality of image sensors, a starting signal generator, a signal timing regulator and an A/D converter. Each image sensor reads images on a pixel basis and generates an image signal indicative of the image. The image signal is an analog signal. The starting signal generator generates starting signals at every predetermined time period. In response to the starting signal sequentially inputted to the image sensors, the image sensors read the image until the predetermined time period is expired. The signal timing regulator delays an input timing at which the starting signal is inputted to the image sensor. The A/D converter converts each image signal to digital signal after a predetermined time has elapsed since each starting signal is inputted to each image sensor.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE PREFERRED EMBODIMENTS

Figure 1:
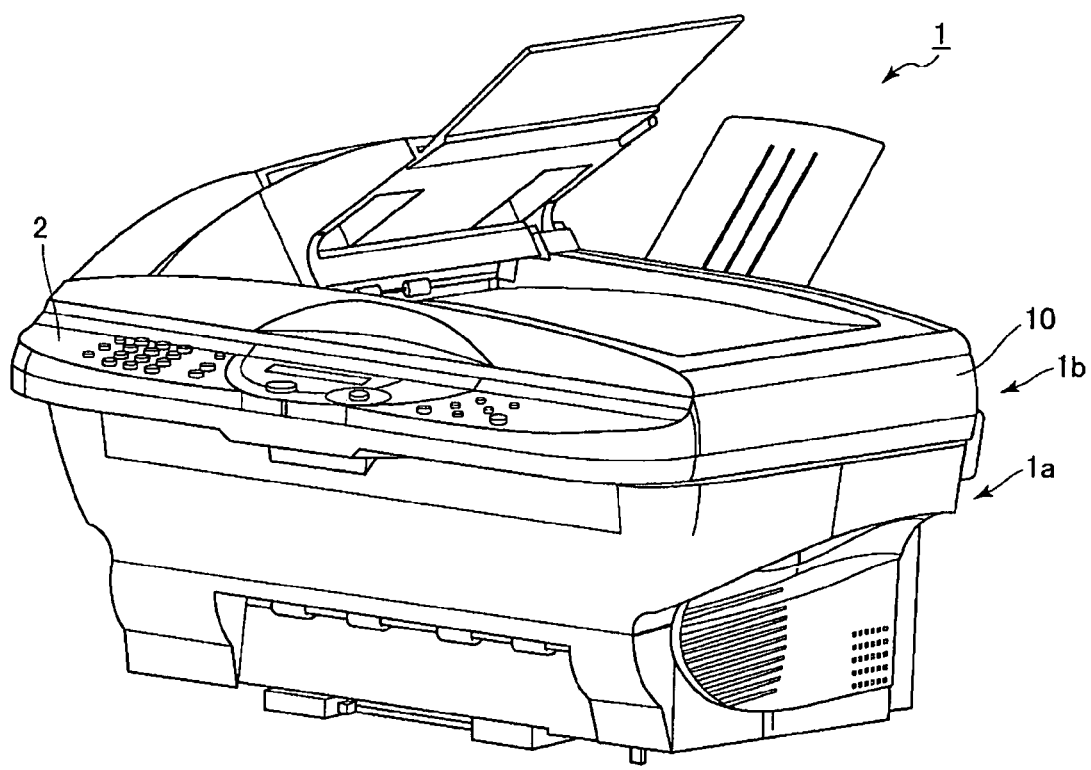
FIG. 1 is a perspective view of a multifunction device incorporating an image-reading device according to a first embodiment of the present invention.

A multifunction device 1 according to preferred embodiments of the present invention will be described while referring to the accompanying drawings wherein like parts and components are designated by the same reference numerals to avoid duplicating description.

FIG. 1 is a perspective view of a multifunction device 1 incorporating an image-reading device 10 according to the first embodiment. The multifunction device 1 has a clamshell structure configured of a lower casing 1a, and an upper casing 1b mounted on the lower casing 1a and being capable of opening and closing thereon. The image-reading device 10 is provided in the upper casing 1b. A control panel 2 is also provided on a front surface side of the upper casing 1b. The multifunction device 1 also includes a laser printer or other image-forming device in addition to the image-reading device 10. However, since this image-forming device is not directly related to the present invention, the device will not be described herein.

Figure 2:
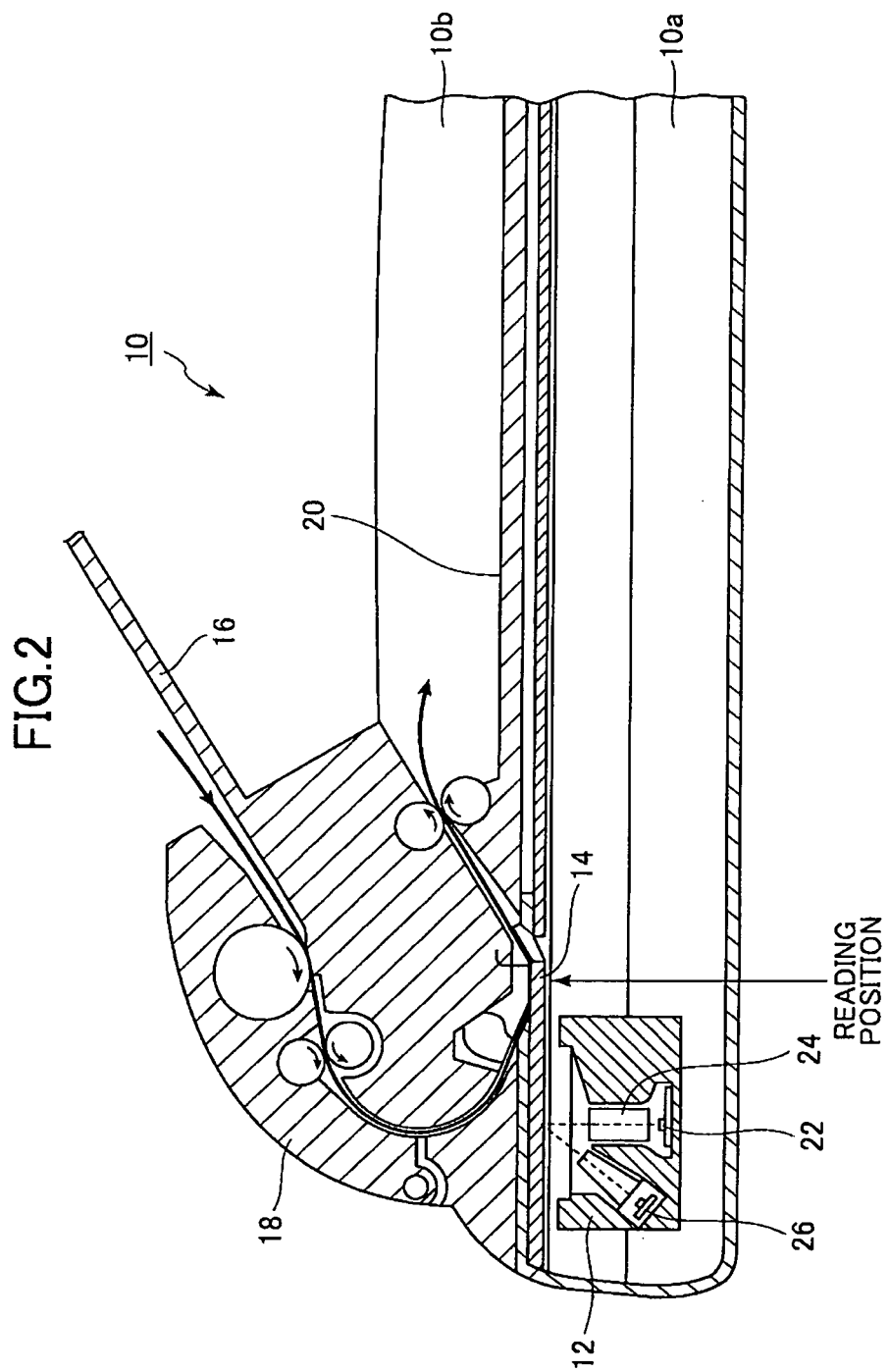
FIG. 2 is a cross-sectional view of the image-reading device according to the first embodiment.

FIG. 2 is a cross-sectional view of the image-reading device 10. As shown in FIG. 2, the image-reading device 10 includes a flatbed mechanism and an automatic document feeder (ADF). The image-reading device 10 itself also has a clamshell structure configured of a flatbed unit 10a and a cover 10b attached to the flatbed unit 10a and capable of opening and closing thereon.

The flatbed unit 10a includes a contact image sensor 12 and a platen glass 14. The cover 10b includes an original tray 16, an original conveying device 18, and an original receiving tray 20.

The contact image sensor 12 includes light-receiving elements 22, such as photodetectors, a SELFOC lens 24, and a light source 26. The light source 26 irradiates light onto the original document at a reading position, and the light-receiving elements 22 receive the light reflected off the original through the SELFOC lens 24. The contact image sensor 12 is configured to read an image based on the results of light received by the light-receiving elements 22.

A driving mechanism (not shown) is also provided for driving the contact image sensor 12 to reciprocate in the left-to-right direction so that the light-receiving elements 22 are moved directly below the reading position in the actual reading process.

Figure 3:
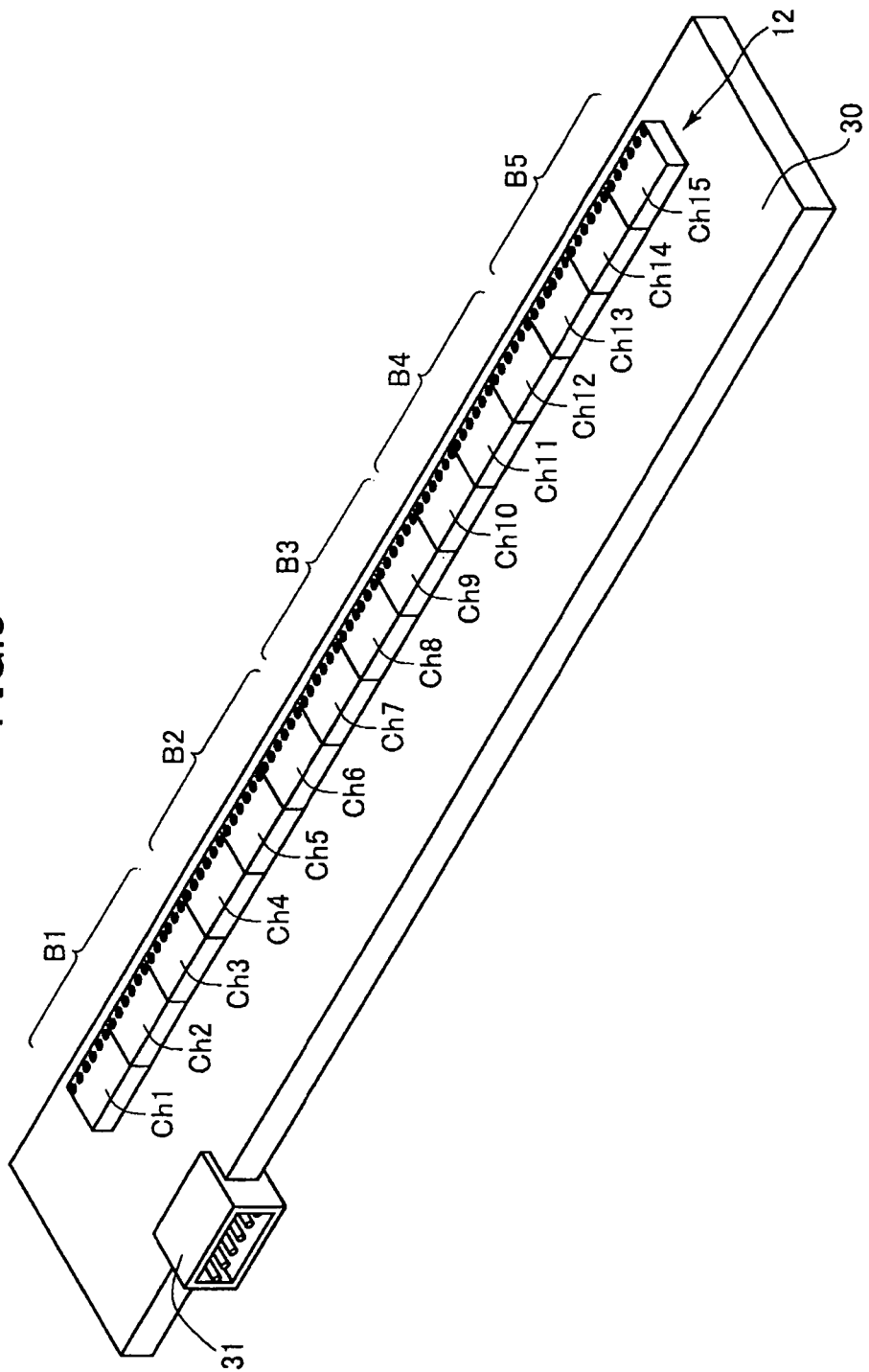
FIG. 3 is a perspective view of a contact image sensor shown in FIG. 2.
Figure 4:
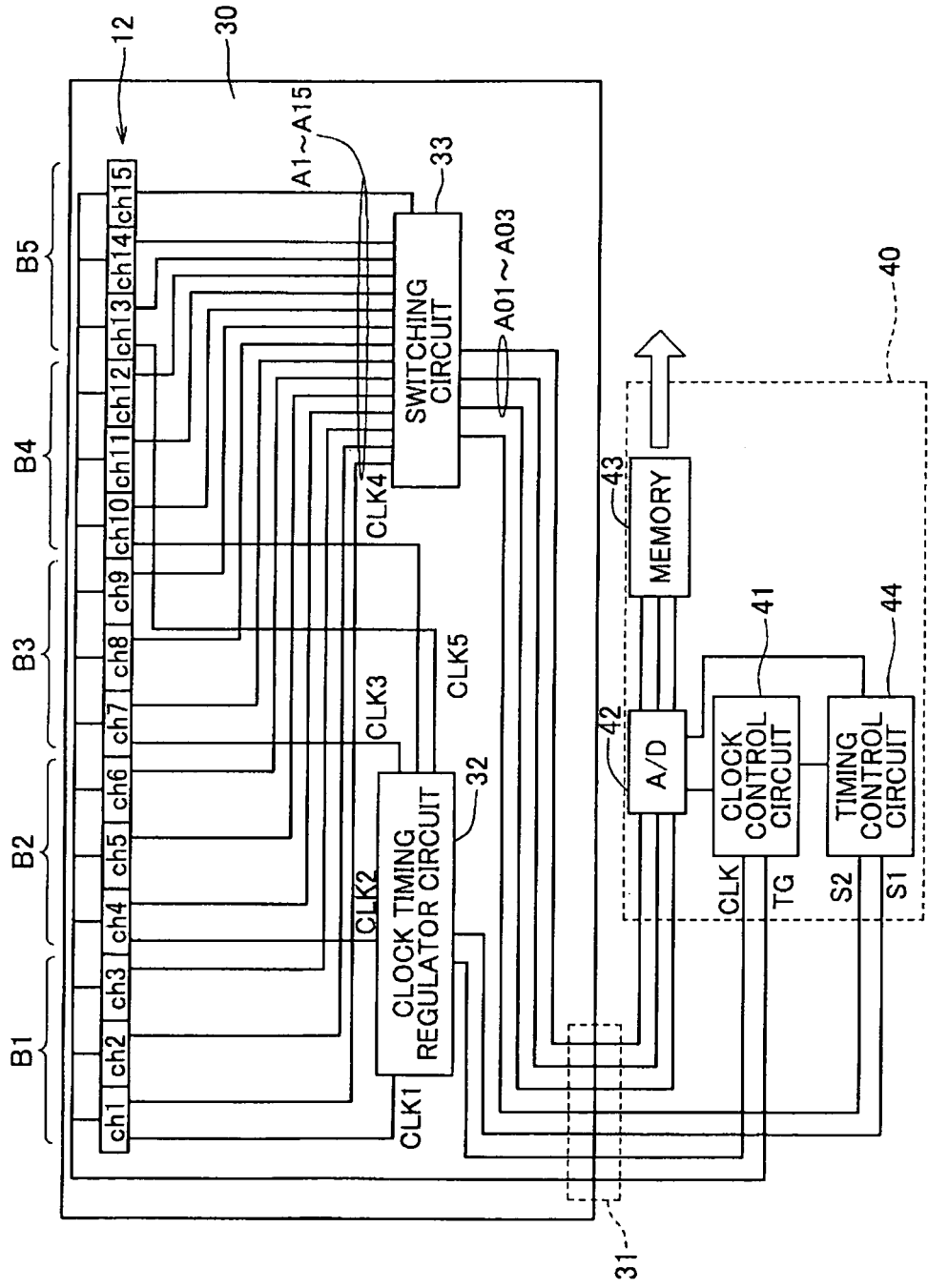
FIG. 4 is a block diagram showing the electrical configuration of the image-reading device according to the first embodiment.

As shown in FIGS. 3 and 4, the contact image sensor 12 is mounted on the surface of a substrate 30 and includes fifteen image sensor IC chips ch1-ch15 aligned in a single row and having light-receiving elements that are also arranged linearly. Here, the expression "arranged linearly" also includes a staggered arrangement. Each of the image sensor IC chips ch1-ch15 is rectangular in shape and includes a plurality of light-receiving elements spaced at intervals in a single row. The contact image sensor 12 is configured to support reading of an original having a width equivalent to an A3-size sheet. Each of the image sensor IC chips ch1-ch15 has a resolution of 1200 dpi (47.2 dot/mm) and has 936 light-receiving elements. Therefore, the contact image sensor 12 is configured of a total of 14,040 light-receiving elements arranged in a single row at equal intervals.

Figure 5:
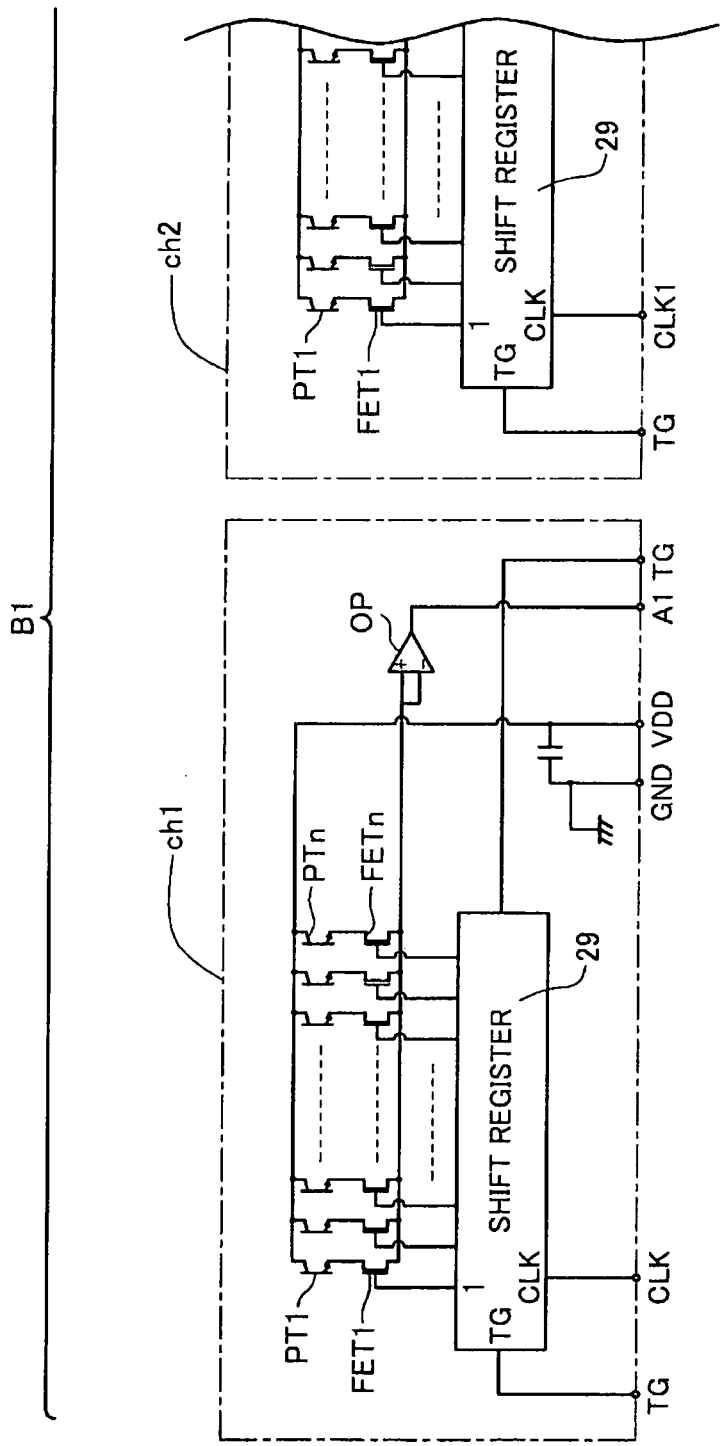
FIG. 5 is a circuit diagram illustrating an example structure of image sensor IC chips shown in FIG. 4.

As shown in FIG. 5, each of the image sensor IC chips ch1-ch15 includes phototransistors PT1-PTn that are configured of light-receiving elements (n=936 in the present embodiment). Upon receiving light, the phototransistors PT1-PTn store an electric charge corresponding to the amount of received light. The basic circuit structure of the image sensor IC chips ch1-ch15 themselves is identical to the conventional image sensor IC chips. When a trigger signal TG outputted from a clock control circuit 41 described later is inputted into the image sensor IC chip, a shift register 29 provided in the chip sequentially turns on a plurality of field effect transistors FET1-FETn in a fixed direction according to an inputted clock signal CLK. As a result, the electric charges stored in the phototransistors PT1-PTn are discharged in a fixed sequence. The electric charges are amplified by an amplifier OP and outputted as a serial image signal AO. The image signal AO is an analog signal. The image sensor IC chips ch1-ch15 also include a voltage terminal VDD through which a drive voltage as required power for operating the components in the image sensor IC chips ch1-ch15 is supplied to the image sensor IC chips ch1-ch15, and a terminal GND connected to ground.

As shown in FIGS. 3 and 4, the image sensor IC chips ch1-ch15 are divided into a total of five blocks B1-B5 with three image sensor IC chips per block. The image sensor IC chips are arranged in a fixed order from one end to the other.

The image sensor IC chips ch1-ch15 for the blocks B1-B5 shown in FIG. 4 have the same configuration. When the clock control circuit 41 described later transmits the trigger signal TG to a connector 31 provided on the edge of the substrate 30, the trigger signal TG is simultaneously inputted into the image sensor IC chips ch1-ch15, driving all the image sensor IC chips ch1-ch15 simultaneously.

As shown in FIG. 4, the connector 31 is provided on an edge of the substrate 30, and a clock timing regulator circuit 32 and a switching circuit 33 are provided on the same surface of the substrate 30 as the contact image sensor 12. The clock timing regulator circuit 32 and the switching circuit 33 are connected to the connector 31 by a wiring pattern. A device external to the substrate 30 connected to the connector 31 via a cable (not shown) can supply power and exchange signals with the image sensor IC chips ch1-ch15.

When the clock control circuit 41 described later inputs a clock signal CLK to the clock timing regulator circuit 32 via the connector 31, the clock timing regulator circuit 32 outputs a first clock signal CLK1, second clock signal CLK2, third clock signal CLK3, fourth clock signal CLK4, and fifth clock signal CLK5 to the blocks B1-B5, respectively. The clock signals are all phase-shifted with respect to each other so that a sampling period for sampling an image signal A1 on the image sensor IC chip ch1 of the block B1, a sampling period for sampling an image signal A4 on the image sensor IC chip ch4 of the block B2, a sampling period for sampling an image signal A7 on the image sensor IC chip ch7 of the block B3, a sampling period for sampling an image signal A10 on the image sensor IC chip ch10 of the block B4, and a sampling period for sampling an image signal A13 on the image sensor IC chip ch13 of the block B5 do not overlap, but still all fit within a single pixel reading period.

Figure 7:
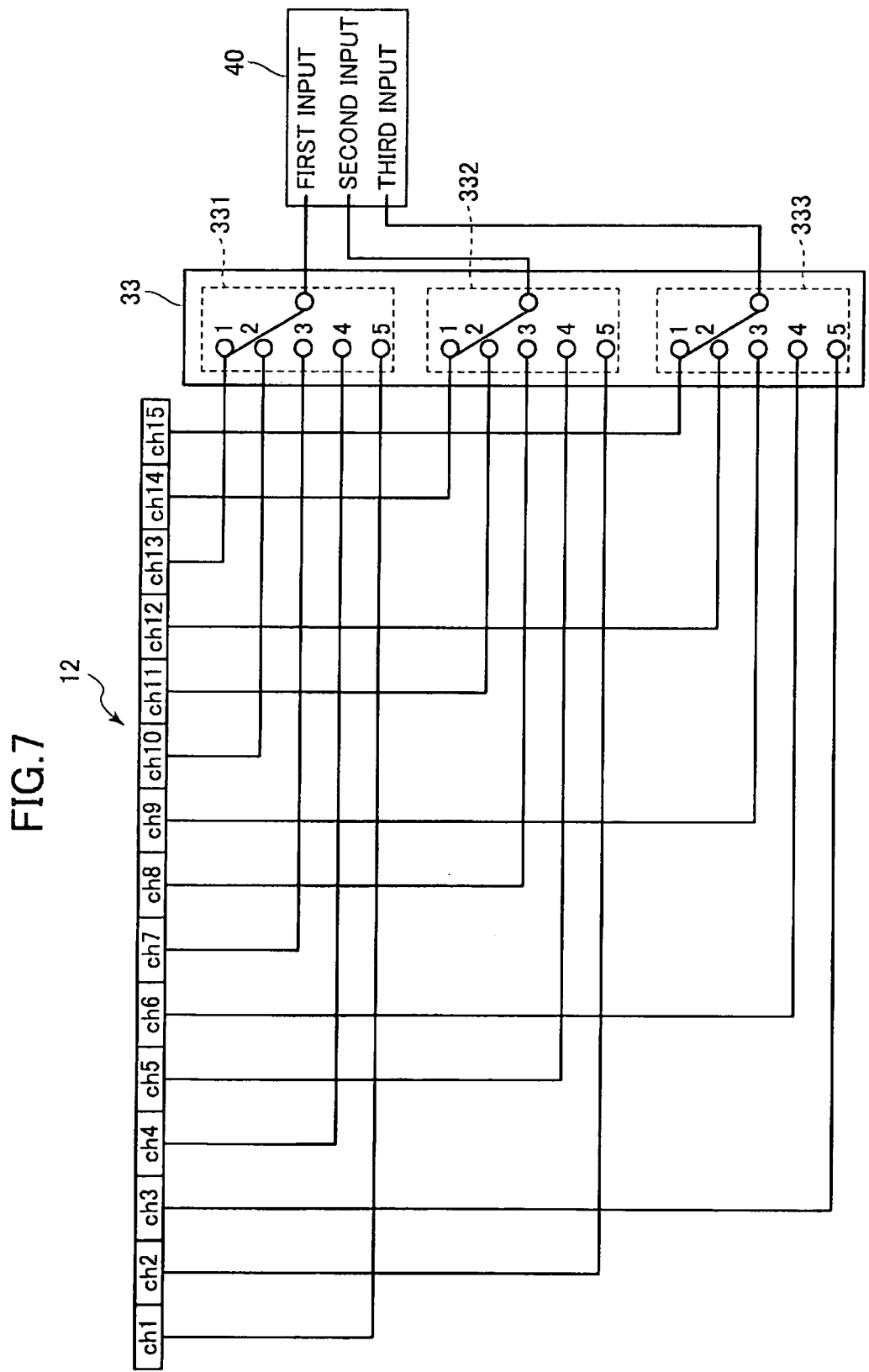
FIG. 7 is a block diagram showing connections between a switching circuit and a contact image sensor in the image-reading device according to the first embodiment.

As shown in FIG. 7, the switching circuit 33 is configured of three quintuple input switches 331, 332 and 333. The first quintuple input switch 331 is connected to the image sensor IC chips ch1, ch4, ch7, ch10 and ch13, and functions to switch the image sensor IC chips ch1, ch4, ch7, ch10 and ch13 using time-sharing to output any of the image signals A1, A4, A7, A10 and A13 as an image signal AO1 to a single triple-channel AFE 40 described later. The second quintuple input switch 332 is connected to the image sensor IC chips ch2, ch5, ch8, ch11 and ch14, and functions to switch the image sensor IC chips ch2, ch5, ch8, ch11 and ch14 using time-sharing to output any of the image signals A2, A5, A8, A11 and A14 as an image signal AO2 to the single triple-channel AFE 40. The third quintuple input switch 333 is connected to the image sensor IC chips ch3, ch6, ch9, ch12 and ch15, and functions to switch the image sensor IC chips ch3, ch6, ch9, ch12 and ch15 using time-sharing to output any of the image signals A3, A6, A9, A12 and A15 as an image signal AO3 to the single triple-channel AFE 40.

As shown in FIG. 4, the image-reading device 10 includes the triple-channel AFE 40 connected to the connector 31 of the substrate 30. The triple-channel AFE 40 is configured of the clock control circuit 41, an analog/digital (A/D) converter 42, a memory device 43, and a timing control circuit 44.

The control circuit 41 is configured to transmit the trigger signal TG and the clock signal CLK to the connector 31. The trigger signal TG is inputted into the image sensor IC chip ch1 as the trigger signal TG1, into the image sensor IC chip ch3 as a trigger signal TG3, and into the image sensor IC chip ch4 as a trigger signal TG4. The trigger signal TG can also be inputted into the image sensor IC chip ch2 via the switch SW1 as the trigger signal TG2. The clock signal CLK is inputted into each of the image sensor IC chips ch1-ch5. The control circuit 41 also outputs the control signal CO1 for switching the switch SW1, the control signal CO2 for switching the switches SW2 and SW3, and the control signal CO3 for switching the image signal selecting circuit 32. The signal lines for the control signals CO1, CO2, and CO3 are indicated by dotted lines in FIG. 4 merely to help distinguish them from the other lines.

The A/D converter 42 is a triple-channel device capable of converting three analog signals to digital signals in parallel. As shown in FIG. 4, the switching circuit 33 outputs the three image signals AO1, AO2, and AO3 that are inputted to the A/D converter 42 via the connector 31.

The memory device 43 is configured of a random access memory (RAM), for example, and functions to store digital data of signals converted by the A/D converter 42 in association with addresses. The clock control circuit 41 functions to control data that is read from the memory device 43 so that one line worth of image signals converted to digital data is outputted from the memory device 43 in a prescribed sequence. The sequence of the image signals is identical to the sequence in which the image signals were obtained when the fifteen image sensor IC chips ch1-ch15 are driven one at a time in order, for example.

The timing control circuit 44 outputs a clock timing control signal S1 to the clock timing regulator circuit 32 and outputs a switch control signal S2 to the switching circuit 33.

FIG. 7 shows an example of connections between the contact image sensor 12 and switching circuit 33. As described above, the contact image sensor 12 is formed of the fifteen image sensor IC chips ch1-ch15. Output terminals of all image sensor IC chip ch1-ch15 are connected to the switching circuit 33.

More specifically, the image sensor IC chip ch1 is connected to a fifth input terminal of the first quintuple input switch 331; the image sensor IC chip ch2 to a fifth input terminal of the second quintuple input switch 332; the image sensor IC chip ch3 to a fifth input terminal of the third quintuple input switch 333; the image sensor IC chip ch4 to a fourth input terminal of the first quintuple input switch 331; the image sensor IC chip ch5 to a fourth input terminal of the second quintuple input switch 332; the image sensor IC chip ch6 to a fourth input terminal of the third quintuple input switch 333; the image sensor IC chip ch7 to a third input terminal of the first quintuple input switch 331; the image sensor IC chip ch8 to a third input terminal of the second quintuple input switch 332; the image sensor IC chip ch9 to a third input terminal of the third quintuple input switch 333; the image sensor IC chip ch10 to a second input terminal of the first quintuple input switch 331; the image sensor IC chip ch11 to a second input terminal of the second quintuple input switch 332; the image sensor IC chip ch12 to a second input terminal of the third quintuple input switch 333; the image sensor IC chip ch13 to a first input terminal of the first quintuple input switch 331; the image sensor IC chip ch14 to a first input terminal of the second quintuple input switch 332; and the image sensor IC chip ch15 to a first input terminal of the third quintuple input switch 333.

An output terminal from the first quintuple input switch 331 is connected to a first input terminal of the triple-channel AFE 40; an output terminal from the second quintuple input switch 32 to a second input terminal of the triple-channel AFE 40; and an output terminal from the third quintuple input switch 33 to a third input terminal of the triple-channel AFE 40.

Next, operations of the image-reading device 10 according to the first embodiment will be described.

First, the clock control circuit 41 of the triple-channel AFE 40 outputs the trigger signal TG. The trigger signal TG is inputted via the connector 31 into each of the image sensor IC chips ch1-ch15 in the contact image sensor 12.

The image signals A1-A15 outputted from the respective image sensor IC chips ch1-ch15 are inputted into the switching circuit 33, while switching among five sampling periods for the image signals A1-A15 during a single pixel reading period.

The clock timing regulator circuit 32 supplies the phase-shifted clock signals CLK1, CLK2, CLK3, CLK4, and CLK5 to the respective blocks B1-B5 of the contact image sensor 12. The phase-shifted clock signals CLK1, CLK2, CLK3, CLK4, and CLK5 offset the sampling periods for the sets of image signals A1-A3, A4-A6, A7-A9, A10-A12, and A13-A15 in the respective blocks B1, B2, B3, B4, and B5 so that the periods do not overlap, while ensuring that the sampling periods for the sets of signals fall within a single pixel reading period.

Using a method of time-sharing, the switching circuit 33 outputs three of the image signals A1-A15 at a time to the triple-channel AFE 40 as image signals AO1, AO2, and AO3 while switching among the sets of image signals A1-A3, A4-A6, A7-A9, A10-A12, and A13-A15 for each block.

The image signals AO1, AO2, and AO3 inputted into the triple-channel AFE 40 are converted into digital signals by the A/D converter 42 and stored in the memory device 43. By not providing the triple-channel AFE 40 with an excess of input channels, it is possible to achieve efficient A/D conversion in this way.

Since the image-reading device 10 of the preferred embodiment has a total of fifteen image sensor IC chips ch1-ch15, and the image sensor IC chips can be divided evenly into five blocks B1-B5, each block has three image sensor IC chips. Therefore, the data lengths of image signals A1-A3, A4-A6, A7-A9, A10-A12, and A13-A15 outputted from the respective blocks B1, B2, B3, B4, and B5 are all the same, and signal processing for each set of image signals can be performed uniformly. Accordingly, this structure facilitates image processing and improves the speed of the image-reading process.

In the first embodiment described above, image signals A1-A15 read from the five blocks B1-B5 in the contact image sensor 12 are outputted while switching between sets of the image signals A1-A15 in the respective blocks B1-B5 in a time-sharing manner so that the sampling period for each set of image signals is phase-shifted while still falling within a single pixel reading period. Accordingly, the image-reading device of the present invention can increase the speed of the image-reading process by a value equivalent to the number of blocks× the number of image signals per block, or 5×3=15 in the present example.

Further, the number of blocks of image sensor IC chips will likely increase with a larger image reading area, as described above. Therefore, when considering a circuit structure employing a contact image sensor, a plurality of triple-channel AFEs has conventionally been required. For example, when using a contact image sensor for an A3-size original, it has been necessary to provide two triple-channel AFEs for six blocks. However, the image-reading device of the present invention can be configured of a single triple-channel AFE 40. Hence, the image-reading device 10 of the present invention can be constructed simply and inexpensively.

[Second Embodiment]

Figure 8:
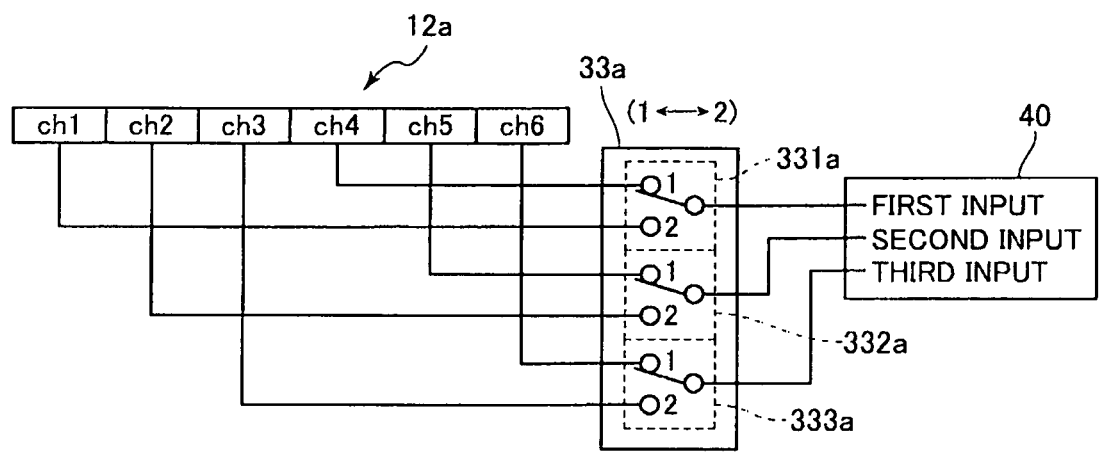
FIG. 8 is a block diagram showing connections between a switching circuit and a contact image sensor in an image-reading device according to a second embodiment.

FIG. 8 is a block diagram illustrating example connections between a contact image sensor 12a and a switching circuit 33a in an image-reading device 10 according to a second embodiment of the present invention. The contact image sensor 12a is formed of six image sensor IC chips ch1-ch6 having output terminals connected to the switching circuit 33a. Specifically, the image sensor IC chip ch1 is connected to a second input terminal of a first dual input switch 331a in the switching circuit 33a; the image sensor IC chip ch2 to a second input terminal of a second dual input switch 332a; the image sensor IC chip ch3 to a second input terminal of a third dual input switch 333a; the image sensor IC chip ch4 to a first input terminal of the first dual input switch 331a; the image sensor IC chip ch5 to a first input terminal of the second dual input switch 332a; and the image sensor IC chip ch6 to a first input terminal of the third dual input switch 333a. An output terminal from the first dual input switch 331a in the switching circuit 33a is connected to the first input terminal of the triple-channel AFE 40; an output terminal from the second dual input switch 332a to the second input terminal of the triple-channel AFE 40; and an output terminal from the third dual input switch 333a to the third input terminal of the triple-channel AFE 40.

The remaining components have the same structure as the image-reading device 10 according to the first embodiment shown in FIGS. 1 through 7. Therefore, a detailed description of these components has been omitted.

In the image-reading device 10 according to the second embodiment, the first, second, and third dual input switches 331a, 332a and 333a in the switching circuit 33a are switched in synchronization. In this way, image signals from the contact image sensor 12a configured of six image sensor IC chips ch1-ch6, which conventionally required two triple-channel AFEs 40 to process, can be processed a single triple-channel AFE 40 in the preferred embodiment.

[Third Embodiment]

Figure 9:
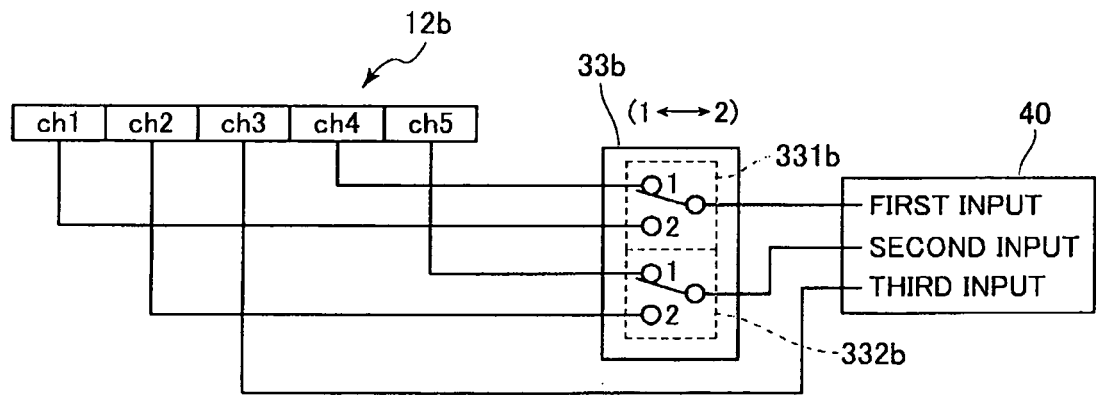
FIG. 9 is a block diagram showing connections between a switching circuit and a contact image sensor in an image-reading device according to a third embodiment.

FIG. 9 is a block diagram illustrating example connections between a contact image sensor 12b and a switching circuit 33b in an image-reading device 10 according to a second embodiment of the present invention. The contact image sensor 12b is configured of five image sensor IC chips ch1-ch5 having output terminals connected to the switching circuit 33b. Specifically, the image sensor IC chip ch1 is connected to a second input terminal of a first dual input switch 331b in the switching circuit 33b; the image sensor IC chip ch2 to a second input terminal of a second dual input switch 332b; the image sensor IC chip ch3 to the third input terminal of the triple-channel AFE 40; the image sensor IC chip ch4 to a first input terminal of the first dual input switch 331b; and the image sensor IC chip ch5 to a first input terminal of the second dual input switch 332b. An output terminal from the first dual input switch 331b in the switching circuit 33b is connected to the first input terminal of the triple-channel AFE 40; and an output terminal from the second dual input switch 332b to the second input terminal of the triple-channel AFE 40.

The remaining components have the same structure as the image-reading device 10 according to the first embodiment shown in FIGS. 1 through 6. Therefore, a detailed description of these components has been omitted.

In the image-reading device 10 according to the third embodiment, the first and second dual input switches 331b and 332b in the switching circuit 33b are switched in synchronization. In this way, image signals from the contact image sensor 12b configured of five image sensor IC chips ch1-ch5, which conventionally required two triple-channel AFEs 40 to process, can be processed a single triple-channel AFE 40 in the preferred embodiment.

While the invention has been described in detail with reference to the specific embodiment thereof, it would be apparent to those skilled in the art that various changes and modifications may be made therein without departing from the spirit of the invention.

For example, though the sampling periods are offset so as not to overlap in the above-described embodiments, the sampling periods may overlap as long as the AFE 40 can samples the image signals inputted into one channel of the AFE 40 at a different timing.

Though the sampling periods are regulated so as to fit within a single pixel reading period in order to raise the processing speed in the above-described embodiments, the sampling periods do not necessarily fit within a single pixel reading period.

Though only the clock signal CLK is regulated in the above-described embodiments, the trigger signal TG may be also regulated besides the clock signal CLK in order to ensure that the sampling periods do not overlap.

Figure 6:
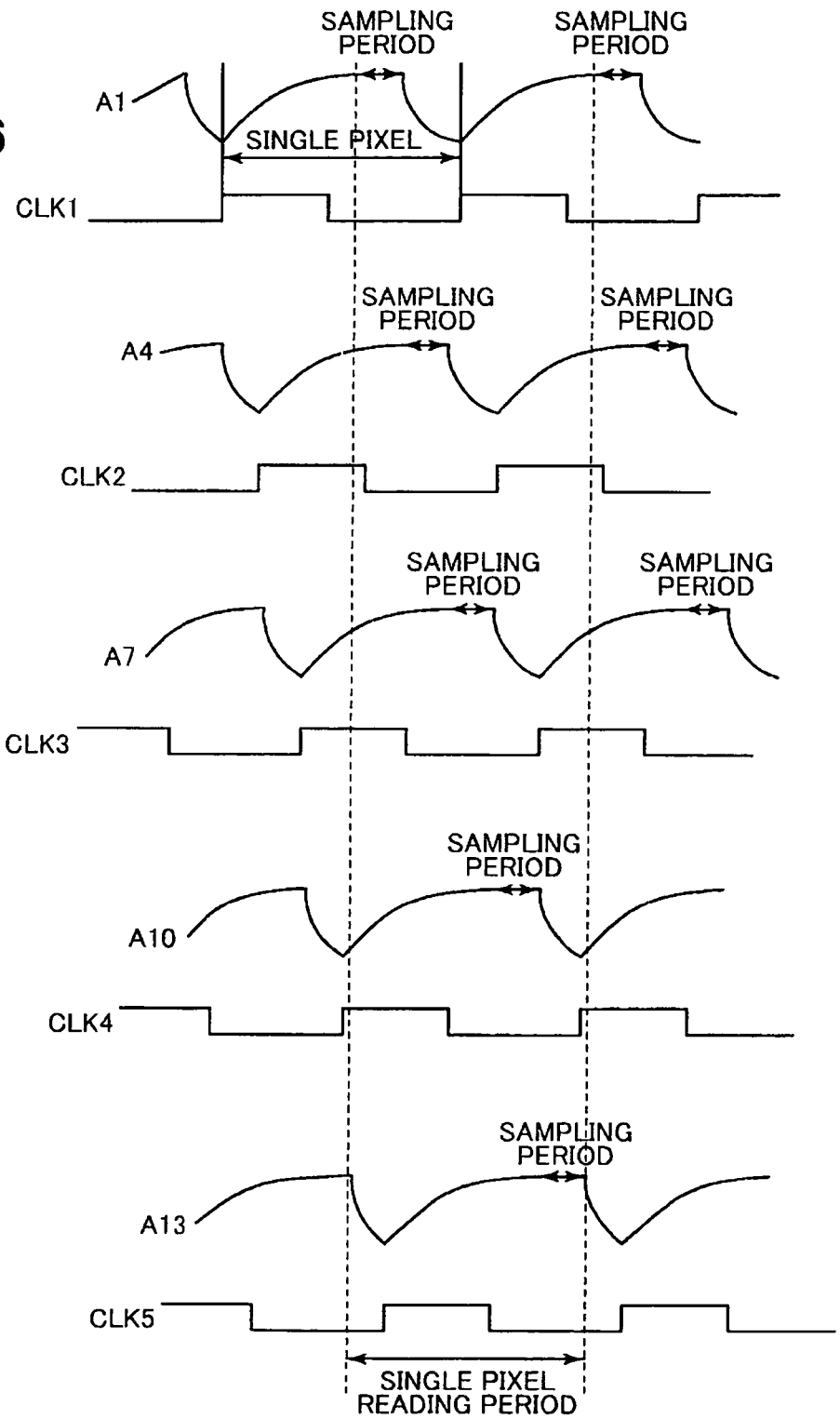
FIG. 6 is timing charts showing a sampling control process performed in the image-reading device according to the first embodiment.

The sampling periods for the plurality of image sensors are regulated by delaying the switching timing of the switching circuit 33 in the above-described embodiment. However, the A/D converter 42 may simply convert each image signal outputted from the switching circuit 33 to digital signal after a predetermined time has elapsed since each clock signal CLK is inputted to each image sensor. For example, as shown in FIG. 6, the A/D converter 42 can convert each image signal after a predetermined time has elapsed since each clock signal CLK is inputted to each image sensor. Thus, the A/D converter 42 can convert each signal at preferable portion for sampling.

What is claimed is:

1. An image-reading device comprising:
a plurality of image sensors, each image sensor reading an image on a pixel basis and generating an image signal indicative of the image, each image signal having a sampling portion to be sampled during a sampling period, the image signal being an analog signal;
a signal outputting unit configured to output a common trigger signal to each of the plurality of image sensors via a common signal line and output a master clock signal at every predetermined cycle period; and
a signal timing regulator configured to input the master clock signal and output a plurality of regulated clock signals which are shifted from each other within the predetermined cycle period of the master clock signal, wherein each of the plurality of regulated clock signals is output to a corresponding one of the plurality of image sensors,
wherein each of the plurality of image sensors is configured to output the image signal upon receiving the common trigger signal and the corresponding one of the plurality of regulated clock signals, such that the sampling periods for the plurality of image sensors shift from one another within the predetermined cycle period of the master clock signal.

2. The image-reading device according to claim 1, wherein the signal timing regulator delays the input timing such that a time span from a starting time of the earliest sampling period among the plurality of sampling periods to an ending time of the latest sampling period among the plurality of sampling periods is shorter than the predetermined cycle period of the master clock signal.

3. The image-reading device according to claim 1, further comprising an A/D converter that converts the image signal to digital signal.

4. The image-reading device according to claim 3, further comprising:

a selector that outputs selected one of the image signals read by the plurality of image sensors; and a selector controller that controls the selector to sequentially output each image signal read by each image sensor during each sampling period.

5. The image-reading device according to claim 4, further comprising A-number sensor blocks, each sensor block including B-number image sensors that output 1st to Bth image signals respectively, wherein B-number selectors are provided, each selector including 1st to Ath input terminals and an output terminal, wherein an Nth selector outputs selected one of Nth image signals respectively read by the Nth image sensors of the A-number sensor blocks, wherein A and B represent integers, and N represents an integer equal to or greater than 1 and equal to or smaller than B.

6. The image-reading device according to claim 5, wherein B=3.

7. The image-reading device according to claim 6, wherein A=5.

8. The image-reading device according to claim 6, wherein the A/D converter has three input parts into which the image signals are inputted respectively, and converts the image signals input into three input parts to the digital signals separately.

9. The image-reading device according to claim 1, wherein the plurality of image sensor is arranged contiguously.

10. The image-reading device according to claim 1, wherein the plurality of image sensors is arranged linearly.

11. The image-reading device according to claim 1, wherein the image sensor is configured of an IC chip.

12. The image-reading device according to claim 1, wherein the image sensor is contact type.

13. An image-reading device comprising:

a plurality of image sensors, each image sensor reading images on a pixel basis and generating an image signal indicative of the image, the image signal being an analog signal;

a signal outputting unit configured to output a common trigger signal to each of the plurality of image sensors via a common signal line and output a master clock signal;

a signal timing regulator configured to input the master clock signal and output a plurality of regulated clock signals which are shifted from each other within the predetermined cycle period of the master clock signal, wherein each of the plurality of regulated clock signals is output to a corresponding one of the plurality of images sensors, respectively; and an A/D converter configured to convert each image signal to a corresponding digital signal after a predetermined time has elapsed since each clock signal was input to each image sensor, wherein each of the plurality of image sensors is configured to output the image signal upon receiving the common trigger signal and the corresponding one of the plurality of regulated clock signals, such that the sampling periods for the plurality of image sensors shift from one another within the predetermined cycle period of the master clock signal.

14. An image-reading device comprising:

a plurality of image sensors, each image sensor including a plurality of light-receiving elements and generating an image signal indicative of the image, the image signal being an analog signal;

a trigger signal outputting unit configured to output a common trigger signal to each of the plurality of image sensors via a common signal line;

a clock signal outputting unit configured to sequentially output a plurality of regulated clock signals for the plurality of image sensors which are shifted from each other within a predetermined cycle period, wherein each of the plurality of regulated clock signals is output to a corresponding one of the plurality of image sensors, respectively;

a sampling chip configured to sample the image signal generated by the plurality of image sensors; and a sampling period setter configured to set, within the predetermined cycle period, a plurality of sampling periods such that the sampling chip samples the image signals generated by the plurality of image sensors sequentially within the predetermined cycle period, wherein the clock signal outputting unit is configured to output each of the plurality of clock signals at a timing related to corresponding one of the plurality of sampling periods, wherein each of the plurality of image sensors is configured to output the image signal upon receiving the common trigger signal and corresponding one of the plurality of regulated clock signals, such that the sampling period setter sets each of the plurality of sampling periods to shift from one another within the predetermined cycle period.

* * * * *